July 6, 1971 P. HOPPE 3,591,444

HEAVY-DUTY FOAM LAMINATES

Filed June 26, 1968

INVENTOR.
PETER HOPPE
BY

United States Patent Office 3,591,444
Patented July 6, 1971

3,591,444
HEAVY-DUTY FOAM LAMINATES
Peter Hoppe, Troisdorf, Germany, assignor to Farbenfabriken Bayer Aktiengesellschaft, Leverkusen, Germany
Filed June 26, 1968, Ser. No. 740,111
Claims priority, application Germany, July 4, 1967,
F 52,850
Int. Cl. B32b 5/18
U.S. Cl. 161—53                    11 Claims

ABSTRACT OF THE DISCLOSURE

A reinforced foam plastic laminate having a special marginal zone reinforcing insert comprising a reinforcing mat and a layer of fibers which are intermeshed with said reinforcing mat to firmly join the marginal reinforcing mat to the foam core. The heavy-duty foam laminates have extremely high static and dynamic strength values and can be used in various forms in the building of vehicles, housing and furniture or the like.

---

Figure 1:
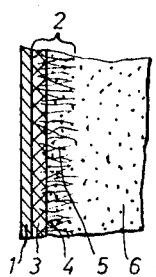

This invention relates to a foam laminate, preferably a polyurethane foam laminate having an outer skin and reinforced between the skins with a fibrous material.

It has been proposed heretofore to prepare foam laminates in which the core layers are of plastic foam, such as polyurethane foam, and which are filled with fibrous materials in order to improve their strength. The heavy-duty foam laminates are provided with cover layers which are made for example from metal or glass fiber reinforced plastics or thermoplastics, and which can be kept extremely thin because of the strength imparted to the laminate by the foam plastic core which prevents the laminate from creasing or buckling. It is already known that the core may be partially filled with random fiber arrangements such that the foam density directly adjacent to the covering layer is greater than that of the internal supporting foam core. This results in improved strength of the heavy-duty foam laminates. It is known that a foam core with a density up to 20 times greater than that of the supporting core can be produced in the zones directly adjacent to the thin covering layer. This particularly improved the crush resistance of the foam laminate.

In the production of complicated sandwich laminates, for example for auto body components, it has been proposed heretofore to prepress or premold the cover layers when they are made from glass fiber reinforced plastic or sheet material in order to provide a preformed cover plate of complicated design in which the foam plastic may be introduced. This involves an additional operation in the manufacture of the finished product such as a vehicle body and is therefore only suitable for special purposes. It cannot be economically adapted to large-scale production line techniques.

Another technique involves the use of a prepolymer which may be reinforced with fiber glass (the so-called glass fiber reinforced pre-preg) which is placed in a mold in mat form and then the polymerization reaction to complete the polymerization of the pre-preg is completed by the exotherm from the polyurethane foaming reaction when the polyurethane components are introduced and foamd between the pre-preg covering layers. The usefulness of this process is severely limited particularly for complicated mold designs. Although the final polymerization of the pre-preg can be controlled effectively enough by the foaming reaction there is inevitably a layer of air between the pre-preg and the mold wall which can only be eliminated by the use of expensive molds with porous walls.

In still a further process the cover layer is produced by laying up the laminate covering layer by hand. In this hand-lay-up technique, reinforced mats, usually in the form of woven cloths, are applied one on top of the other in several layers to the inside of the mold which is then coated with a binder such as polyester or epoxide resin. The polyester or epoxide resin is applied manually to each layer of cloth and it is necessary to take strict precautions to assure that the air present is driven out of the reinforcing mats by the resin applied. Manual work of this kind is time consuming and can not be tolerated for mass production of heavy-duty foam laminates. Even for the specialty uses where such a hand-lay-up technique can be tolerated, it is necessary to bond a reinforcing mat to the inner surface in order to produce an effective union between the supporting core and the covering layer. If the reinforcing mat is omitted the product will have insufficient stiffness in the marginal zone of the foam core adjacent to the covering layer.

While all of these processes have been used heretofore for the production of specialty or experimental items, they have not been used on a large commercial scale because of the expense and unsatisfactory characteristics of the operations.

It is therefore an object of this invention to provide an improved foam laminate which can be mass produced and which shows extremely high static and dynamic strength values. Another object of this invention is to provide a reinforced foam structure and a method of producing it which avoids the need to use a preformed cover layer. Still another object of this invention is to provide improved foam articles such as vehicle bodies, walls for dwellings, articles of furniture and the like which have improved stiffness and extremely high static and dynamic strength values. Still another object of this invention is to provide an improved method of making a reinforced foam plastic article which is adaptable to commercial production. A further object of this invention is to provide an improved method of anchoring the foam core of a laminate-like structure to the marginal thickness zone in a foamed article which has a cross-sectional structure similar to that of bone.

The foregoing objects and others which will become apparent from the following description are accomplished in accordance with the invention, generally speaking, by providing a reinforced foam article and method for the production thereof, said foamed article having a marginal zone containing a reinforcing insert containing intermeshed fibers which extend from said reinforcing insert into the core of said foamed article. Thus the present invention provides a foamed article which may be a foam laminate that can be produced commercially and which shows extremely high static and dynamic strength properties. The foam article of the invention has a special marginal zone, i.e. a zone near the outer edge which contains a reinforcing mat and a layer of fibers which extend from the mat into the foam core so that they are intermeshed and provide an additional connection between said reinforcing mat and said foam core to lock the two together so that they are firmly and inseparably joined.

There is no need to use a preformed cover layer when the method of this invention is employed in order to produce a heavy-duty foamed plastic reinforced article. It is possible however in accordance with the invention to employ covering layers where especially high strength values are desired. Thus strong sandwich structures can be prepared if a covering layer of plastic, metal or the like is used together with the marginal zone reinforcing mat and intermeshed fibers. Whereas in conventional foam laminate fibrous fleeces are adhesively bonded to the reinforcing mats in a separate operation, one of the advantages of the present invention is the direct use of the fibers for force transfer or propagation by joining them to the reinforcing mat.

Figure 2:
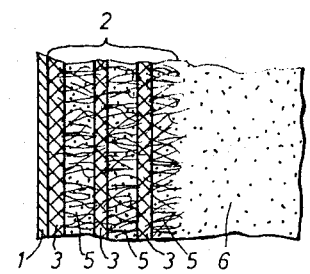
Figure 3:
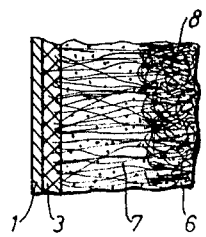

The invention is further illustrated by the drawing, in which FIG. 1 is a schematic cross-section of the foamed article of the invention showing one reinforcing mat and one layer of fibers, FIG. 2 is a similar view showing a plurality of reinforcing mats and FIG. 3 is a similar view showing a long fibered three dimensional anchoring fleece whose fibers project deep into the foam core.

In cases where only one reinforcing mat, which may be, for example, a woven glass cloth or the like, is used in conjunction with a single arrangement of fibers, the fibers are joined to the cloth so that the free ends project into the foam core and anchor the reinforcing mat as a whole to the foam core. This greatly enhances the strength of the overall structure. The fibers are preferably in the form of a three-dimensional long fibered fleece which is joined to the reinforcing mat by sewing, needling or the like, with the free ends projecting into the foam core. When following the method of the present invention where the marginal zone reinforcing layer contains the intermeshed fibers extending into the foam core, it is possible to produce heavy-duty foamed articles or foam laminates which are at least equally as strong as the products produced by the hand-lay-up method or by forming prefabricated covering layers and then foaming therebetween. The present invention renders superfluous the expensive prefabrication of cover layers, or if cover layers are used in order to produce exceptionally high strength properties the products can be economically produced by the present method.

Any suitable outer skin may be used where it is desired, including materials such as steel, aluminum, alloys and the like, as well as thermoplastics including polyesters, epoxides, polyurethanes and the like. It is also possible to use glass fiber reinforced polyesters, epoxies, pre-pregs or the like. In addition the outer skin may be applied to the mold as an elastic gel coat which is preferably based on polyurethanes. The gel coat is used for coating the inner wall of a mold which has been lined beforehand with a mold release agent such as carnauba wax or the like. The gel coat acts both as a surface protection and as a means for anchoring the reinforcing mat in position in the marginal zone in the mold. In other words the gel coat is sticky and the mat can be laid against it and will be held in place while the foaming reaction takes place. The gel coat should be thick enough that no fibers which have been intermeshed into the reinforcing mat will project through to the outside of the mold. This also prevents surface corrosion of the foam core during formation by capillary action.

Suitable reinforcing mats for use in the reinforcing system according to the invention include all the conventional products in sheet form which can be surrounded or impregnated with foam plastic such as, for example, glass cloths, woven fabrics from synthetic fibers or wires such as nylon, polyesters, acetate or the like, as well as woven wire and wire gauze inserts, textile fabrics such as cotton, wool, rayon or the like, as well as metal or plastic skeletons which may be rods formed to fit roughly into the mold in the marginal zone adjacent to the gel coat. It is also possible to use combinations of these reinforcing mats such as for example a glass fiber mat may be placed adjacent to the gel coat with a woven wire insert on top and the fibers then project from the glass fiber mat through the wire insert into the foam core to provide even greater strength to the product. While the three-dimensional random fiber fleeces are preferably used, it is also possible to use crepe fabrics or even loose fiber fabrics as the reinforcing mat.

The thickness of the reinforced marginal zone varies depending upon the strain which the foam laminate is designed to withstand. In a particularly preferred embodiment of the invention where exceptionally high strength is desired, several reinforming mats with intermeshed fibers extending between the layers are piled one on top of the other and then firmly joined together to form a thickened marginal zone and to impart very high strength to the resulting foam article. With a marginal zone reinforcing insert produced this way it is possible to produce a three-dimensional structure which is exceptionally strong. The density of the foam in the marginal reinforcing zone can be adjusted by arrangement and thickness of fibers connecting the reinforcing mat with the foam core. The designer of a part is thereby enabled to vary the density of the foam laminate at its marginal zone in such a way as to increase the strength of the structure as a whole. At the same time the fibers in the three-dimensional arrangement of the combination of the reinforcing mat and fibers which extend into the foam core are utilized to transfer and absorb transverse forces between the different reinforcing mats.

The foamed article or foamed laminate of the invention can be produced in various forms. Generally speaking it is desirable to have a decrease in density from the marginal zone toward the center of the foam core and it is most preferred that the rate of decrease be approximately continuous throughout the different layers of fibers. Other density patterns may be used however for various structural reasons. The selection of fibers may be based on their strength or thickness or length in order to provide various special properties or to influence the density of the foam. Generally speaking the density of the foam increases as the weight per unit area and the thickness of the fiber arrangement increases and as the denier of the fiber decreases. Another important factor governing the density of the foam is the foaming pressure prevailing inside the mold during the foaming operation. In the conventional method of producing foam laminates the density of the foam does not have to decrease throughout the entire cross-section of the foam laminate. In addition density may also be influenced by varying the constituents of the reaction mixture without in any way affecting the overall weight of the material itself. When all of these factors are considered together, particularly the foaming method employed, the composition of the reaction mixture, the choice of fiber and the intermeshing of the fibers with the reinforcing mats, one can see that a designer of a part, for example a vehicle body, can vary the distribution and density of the foam in the article as desired to enhance the strength poperties at critical points.

In accordance with a preferred embodiment of the invention a foam laminate is produced in such a way that the foam undergoes an approximate continuous decrease in density from the first layer of fibers toward the center of the core preferably from about 1.1 to about 0.02 g./cm.$^3$. It was impossible to achieve so great a decrease in density with the heretofore known conventional foam laminating techniques. In the first layer of fibers, i.e. between the first and second reinforcing mats where a plurality of reinforcing mats are used, the density of the foam falls from about 1.1 to about 0.6 g./cm.$^3$. In the second layer it falls from about 0.6 to 0.1 g./cm.$^3$ and from the intermost reinforcing mat to the center of the core it falls from about 0.1 to 0.02 g./cm.$^3$ in a typical foam laminate of the invention. In this particular embodiment the intermost side of the intermost reinforcing mat is intermeshed with a random fiber fleece containing fiber systems that retard expansion of the reaction mixture because they are butted or crimped and yet can be completely filled with foam because of a relatively loose arrangement. Such a random fiber fleece or mat can be of natural or synthetic monofils of considerable thickness, for example several inches up to six inches is suitable. The diameter of the monofils is preferably in the range of 0.1 to 0.3 mm., and a length of at least 10 mm., and preferably at least 30 mm. is best.

When the method of the invention is followed a foamed article is obtained which has an ideally graduated density comparable for example with the natural structure of a bone or the trunk of an elder tree where the center is of a lower density than the periphery or marginal zone near the hard outer structure of the bone or tree trunk. The effectiveness of this automatically produced varying density comes from the fact that the reaction mixture penetrates into the layer of fibers and the foaming reaction is thereby retarded in the marginal zone where the reinforcing mat is located. In the core toward the center of the mold the reaction mixture foams unimpeded and forces more liquid components into the reinforcing layer of fibers. Since the empty space in the interior of the laminate is under an excess of pressure due to the spontaneous unimpeded foaming reaction the still liquid creamy foam has a blocking effect on the reaction mixture foaming under resistance in the layers of fibers. It therefore compresses to even a greater extent that portion of the reaction mixture which is reacting in the reinforcing mat adjacent to the mold surface. The air from the marginal zone is therefore carried freely into the reacting interior of the foam core and does not form blemishes on the exterior of the foamed article.

The layer of fibers nearest the inside of the foam laminate advantageously compresses a three-dimensional random fiber fleece which is intermeshed or firmly connected with the reinforcing mat. The fibers should be as long as practically possible to enable the reinforcing mat to be anchored deeply to the foam core. It is possible after the marginal zone reinforcing insert has been applied to the mold, but before foaming, to brush up the intermeshed fibers so that they project like wool into the space to be filled with foam. The fibers preferably project a distance of at least about 10 mm. and most preferably at least about 20 mm. into the foam core. Any suitable fibers may be used including, for example, nylon fibers, fine denier acrylic fibers, polyester fibers or the like. Where the brushing technique set forth above has been used it is possible to obtain a foamed article of sufficient strength that the supporting covering layer suffered tensile failure before there was compression failure of the article due to premature buckling when the article was subjected to alternate bending. The firm anchorage obtained by the use of the brushed fleece enabled the production of a foamed laminate according to the invention which could be modeled on the tensile strength of the covering layer. Even greater strengths are obtained if a fleece made of coarse denier rather than fine denier fibers is used. For example it is preferred to use polyamide based fibers which if permitted by the thickness of the article to be produced have a length of from about 10 to about 30 mm. or even longer, and may have a weight per unit area of more than 250 g./cm.²

In accordance with still another embodiment of the invention the mold can be either wholly or partially filled with a fleece which is preferably from about 20 to about 30 mm. thick. The fleece can be crimped to allow it to be more effectively impregnated with the foaming ingredients. The foaming ingredients are inserted on top of the fleece and then the mold is closed. The fleece is compressed somewhat by the lid of the mold and the fleece is then meshed into the reinforcing insert which has been introduced underneath the fleece beforehand. Thus the fleece and the reinforcing insert are held in place during the foaming operation. Additional core reinforcement is therefore possible for example based on coarse denier random fleeces which even further increase the shear strength of the core and impart greater rigidity to the structures of the type proposed by the invention.

The invention is further illustrated but is not intended to be limited by the following example in which all parts and percentages are by weight unless otherwise specified.

EXAMPLE

Tests conducted on a foam laminate according to the invention showed that, although it is equal in weight to a sandwich structure produced by foaming from cover layers obtained by the molding or hand-lay-up processes from glass fiber reinforced plastics, for example epoxide resins with a density of 1.6 g./cm.³ and a thickness of 2 mm., a bonded glass fiber reinforcing mat with an anchoring fleece of 450 g./cm.² and a polyurethane based foam supporting core with a unit weight of 90 kg./m.³, it has the same torsional stiffness if a reinforcing insert consisting from outside to inside of two layers of glass cloth each weighing 900 g./m.², and two layers of acrylic fiber fleece each weighing 100 g./m.² (in alternate layers) is rolled into a 0.5 mm. thick gel coat of an epoxide resin, the inner acrylic fiber fleece having been brushed up and the mold thus equipped being filled with a quantity of foaming polyurethane reaction mixture corresponding to the total weight of the comparison structure. The average density of the reinforced outer foam shell of the foam laminate produced by pressure foaming (three-fold consolidation) amounted to 0.8 g./cm.³ and throughout its cross-section showed a continuous decrease in density from 1.1 g./cm.³ to 0.6 g./cm.³. In the proximity of the anchoring fleece, there was a decrease in density from 0.6 to 0.1 g./cm.³ for an anchoring zone 5 to 10 mm. thick. The inside of the core had a denstiy of 0.06 g./cm.³.

It is to be understood that any suitable polyurethane plastic foam such as those disclosed for example in U.S. Reissue Pat. 24,514 may be used as the foaming ingredient of the invention. In the above example the following reaction ingredients are admixed in a mixing device as disclosed in U.S. Reissue Pat. 24,514 having four entrance conduits at the upper portion of the mixer. About 100 parts of a polyhydric polyalkylene ether prepared by condensing propylene oxide with glycerine until a product having a molecular weight of about 3,000 and an hydroxyl number of 56 results are introduced through one conduit. About 38 parts of a mixture of 80% 2,4-tolylene diisocyanate and 20% 2,6-tolylene diisocyanate are introduced through a second conduit. About 0.5 part of N-ethyl morpholine, about 0.1 part tetramethyl-1,3-butane diamine and about 0.3 part stannous octoate are introduced through a third conduit. About 1.0 part of a silicone copolymer having the formula:

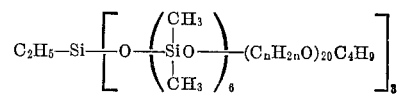

about 2.9 parts water and about 0.4 part resorcinol are introduced through a fourth conduit. The foaming ingredients are then introduced on top of a reinforcing mat as disclosed above in a mold to prepare an automobile body frame.

Comparison shows that it took five times as long to manufacture the conventionally produced sandwich plastic structure than to produce foam laminate described in accordance with the invention, thus emphasizing the advantage of the invention so far as the mass production of heavy duty plastics components, such as vehicle bodies, is concerned. Another factor of importance is that, in the production of heavy-duty foam structure reinforced with fibers along the marginal zones, the exapndable reaction mixture, for example based on polyurethane, is the only active production factor in the formation both of the supporting, reinforced outer skin and of the lightweight core by which the skin is supported. Another important feature is that the associated production of supporting systems for foaming molds, which may have to be designed to withstand a foaming pressure of up to 15 atms., depending on the type and size of the component, can be carried out very simply by removing thin mold shells, for example of polyurethane, epoxide resin, polyester resin or metal, from a model of the component, and supporting those unstable contour shells in, for example, as stable, solid contoured steel-reinforced concrete mold.

The heavy-duty foam laminate according to the invention may also be used for the production of sandwich supporting cores for very large structures in the building construction or vehicle building industries, in instances where for reasons of rigidity, it is desired to stabilize high grade thick sandwich cover layers, for example of 2 to 5 mm. steel or lightweight metal sheet, or of 10 mm. thick glass fiber reinforced plastics panels, against local buckling over a large area. The resistance to buckling of panels more than 2 mm. thick, of the kind required for example as cover layers for sandwich structures, for example for large components such as frames, walls and shells in building construction, due to the highly economic manufacturing techniques, can be increased up to material strength by the high-grade supporting cores according to the invention.

A foam laminate according to the invention may be further locally reinforced by additional heavy-duty cover layers for cross-sections or connecting zones subjected to considerable flexure and torsion, so that the structure as a whole is based on a combination of pure foam with a sandwich laminate.

The foam laminate according to the invention may be used with particular advantage for the production of car bodies, air frames and ships' hulls.

According to the invention, the reinforcing mats are firmly joined with the layers of fibers by needling. For this purpose, the reinforcing mats and the fiber arrangement are arranged one above the other, and the ends of the fibers are worked into the reinforcing mat, and thus anchored in it, by means of a needling machine. With multi-layer reinforcing inserts, the ends of the fibers, providing they are long enough, may even be drawn through several reinforcing mats and fiber arrangements. This provides a particularly high level of resistance.

In another embodiment, the ends of the fibers are bonded to the reinforcing mats. The only disadvantage of this is that some of the openings in the reinforcing mat are thus obstructed so that the reaction mixture is prevented from foaming through the mat. If, on the other hand, insufficient adhesive is applied, the end of the fibers are inadequately bonded to the reinforcing mats. This method of bonding is not to be confused with the conventional method of bonding fibers to the insides of cover layers, or to the insides of resin-impregnated reinforcing mats, because in the present case the foam which is formed must be able to penetrate through the adhesive bond.

In another embodiment, the fibers are attached to the reinforcing mats by sewing or pinning. The stitches may follow a quilted pattern. If pins are used, they may be arranged as in upholstery so that a cushion-like pattern is obtained. One disadvantage of this particular embodiment for some applications, is that the marginal zone reinforcing insert is no longer, uniform in thickness. On the other hand, this apparent disadvantage provides the designer with another opportunity to even further strengthen the anchorage. In another particularly favorable embodiment, fibers are woven into the reinforcing mat. These fibers may be separate fibers or ends of long fibers in the constituent materials of the reinforcing mat.

In another embodiment, electrostatically flocked widemesh reinforcing mats are used, further improving anchorage with the fiber arrangements.

Several embodiments of the foam laminate according to the invention are shown in cross-section by way of example in FIGS. 1 to 3 of the accompanying drawings.

Referring now to the drawings, as shown in FIG. 1, the entire marginal zone reinforcing insert 2 is bonded into an outer skin 1 consisting of a gel coat. It consists of the reinforcing mat 3 with which the fibers 4 of the layer of fibers 5 are firmly united. The foam core is 6.

As shown in FIG. 2, the marginal zone reinforcing insert 2 consists of several layers of reinforcing mats 3 and layers of fibers 5 whose constituent fibers 4 are firmly united with the adjacent reinforcing mats.

As shown in FIG. 3, a marginal zone reinforcing insert 2 has been pressed into the outer skin 1 in the form of a gel coat. Its reinforcing mat 3 is lined with a long-fibered three-dimensional anchoring fleece 8 whose fibers project deep into the foam core.

Although the invention has been described in considerable detail in the foregoing for the purpose of illustration, it is to be understood that such detail is solely for this purpose and that many variations can be made by those skilled in the art without departing from the spirit of the invention and the scope of the claims.

What is claimed is:

1. In a heavy duty, rigid article such as auto body components, structural members, furniture and the like having high static and dynamic strength values, comprising a core of foamed material having at an outer surface thereof a laminate composed essentially of an outer skin having on the inwardly disposed side thereof, a marginal zone reinforcing insert comprising a reinforcing mat bonded to the skin, and a layer of fibers in the form of a random fiber fleece joined to the reinforcing mat, fibers of the random fiber fleece penetrating the outwardly disposed part of said foamed material and improving the strength of the bond between said laminate and the core, the improvement which comprises the fibers of said random fiber fleece being intermeshed with the reinforcing mat to firmly join the random fiber fleece to the reinforcing mat and the material composing the foamed material penetrating the laminate through to said skin, whereby improved strength characteristics are imparted to said article.

2. The foamed article of claim 1 wherein said foam is a polyurethane foam.

3. The foamed article of claim 1 wherein the density of the foam in the marginal zone is at least 0.8 g./cm.$^3$.

4. The foamed article of claim 1 wherein the layer of fibers nearest the interior of the foam laminate is a three-dimensional long fibered fleece.

5. The foamed article of claim 1 wherein a crimped fiber fleece is in the center core.

6. The foamed article of claim 1 which comprises a vehicle body.

7. The foamed article of claim 1 wherein the reinforcing mat is joined to the fibrous layer by needling.

8. The foamed article of claim 1 wherein the reinforcing mat is adhesively bonded to the fibrous layer.

9. The foamed article of claim 1 wherein the reinforcing mats are bonded to the fibrous layers by sewing, pinning, weaving or electrostatically flocking.

10. The foamed article of claim 1 wherein several reinforcing mats are arranged one over the other, each of the said several reinforcing mats having a random fiber fleece joined thereto, the material of said foam penetrating the reinforcing mats and random fiber fleeces as aforesaid.

11. The foamed article of claim 10, fibers of an inwardly disposed fiber fleece being intermeshed with at least two reinforcing mats disposed outwardly thereof.

References Cited

UNITED STATES PATENTS

| | | | |
|---|---|---|---|
| 2,724,868 | 11/1955 | Kish | 264—45 |
| 2,948,651 | 8/1960 | Waag | 161—53 |
| 3,205,106 | 9/1965 | Cross | 161—161X |
| 3,451,884 | 6/1969 | Anno et al. | 161—67X |
| 3,459,579 | 8/1969 | Newman | 161—64X |

JOHN T. GOOLKASIAN, Primary Examiner

J. C. GIL, Assistant Examiner

U.S. Cl. X.R.

161—64, 67, 69, 161; 264—45, 257, 276

PO-1050
(5/69)

UNITED STATES PATENT OFFICE
CERTIFICATE OF CORRECTION

Patent No. 3,591,444      Dated July 6, 1971

Inventor(s) Peter Hoppe

It is certified that error appears in the above-identified patent and that said Letters Patent are hereby corrected as shown below:

Col. 6, the formula, change sub-script "20" to --30--.

Signed and sealed this 21st day of March 1972.

(SEAL)
Attest:

EDWARD M. FLETCHER, JR.      ROBERT GOTTSCHALK
Attesting Officer      Commissioner of Patents